United States Patent

Thiessen et al.

[19]

[11] Patent Number: 6,038,111
[45] Date of Patent: Mar. 14, 2000

[54] CARTRIDGE HAVING BRUSHES ABOVE AND BELOW A CLEANING TAPE FOR CLEANING THE RECIPROCATING READ/WRITE HEAD OF A MAGNETIC TAPE PLAYER AND/OR RECORDER

[75] Inventors: Jeffrey S. Thiessen, Champlin; John M. Enga, Rogers, both of Minn.

[73] Assignee: Geneva Group of Companies, Inc., Minneapolis, Minn.

[21] Appl. No.: 09/015,869

[22] Filed: Jan. 29, 1998

[51] Int. Cl.[7] ........................................................ G11B 5/41
[52] U.S. Cl. ............................................................ 360/128
[58] Field of Search .............................. 360/128; 369/71; 15/DIG. 12, DIG. 13

[56] References Cited

U.S. PATENT DOCUMENTS

| | | | |
|---|---|---|---|
| 4,698,712 | 10/1987 | Fritsch | 360/128 |
| 5,461,529 | 10/1995 | Clausen | 360/128 |
| 5,541,794 | 7/1996 | Griffen et al. | 360/128 |
| 5,742,461 | 4/1998 | Benson et al. | 360/128 |

*Primary Examiner*—William R. Korzuch
*Attorney, Agent, or Firm*—Moore & Hansen

[57] ABSTRACT

A cleaning cartridge for cleaning the read/write head of a tape drive having at least one stationary cleaning element with filaments or strands positioned to loosen and remove debris from the air bleed slots of the read/write head. The cleaning cartridge cleans the air bleed slots at the same time as cleaning the tape contact surface of the read/write head.

13 Claims, 1 Drawing Sheet

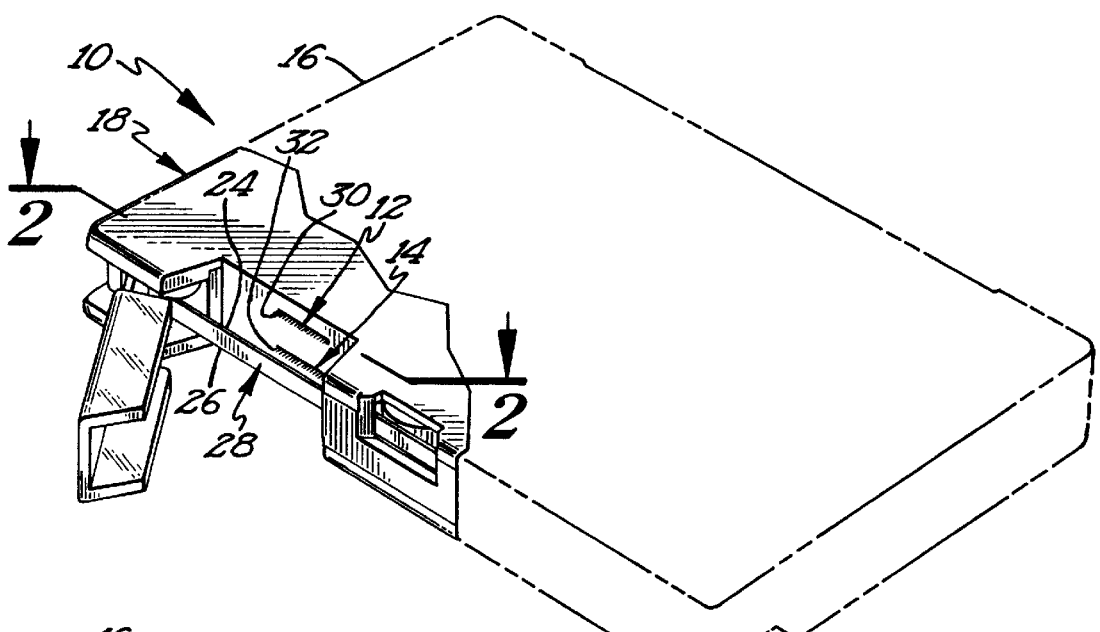
Fig 1
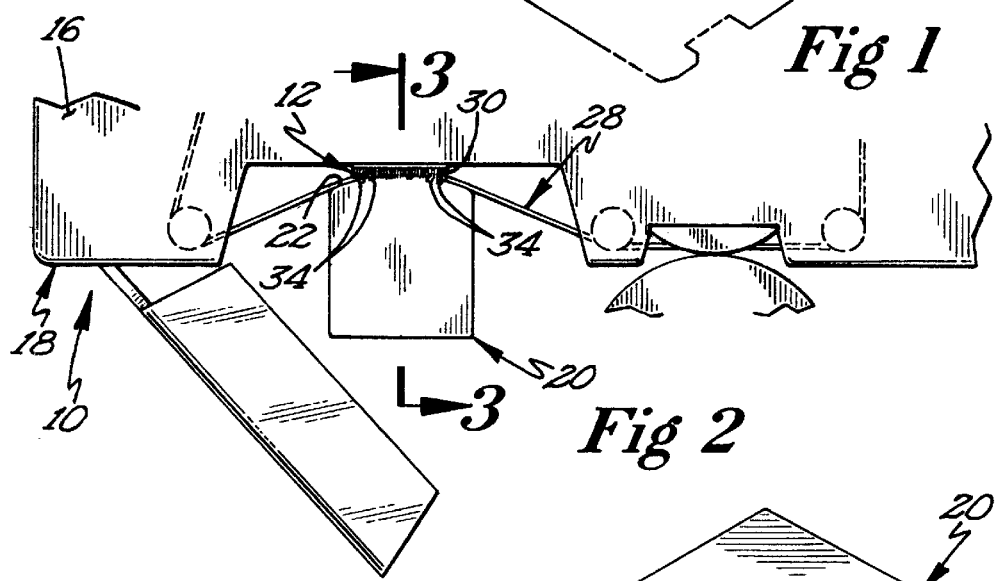
Fig 2
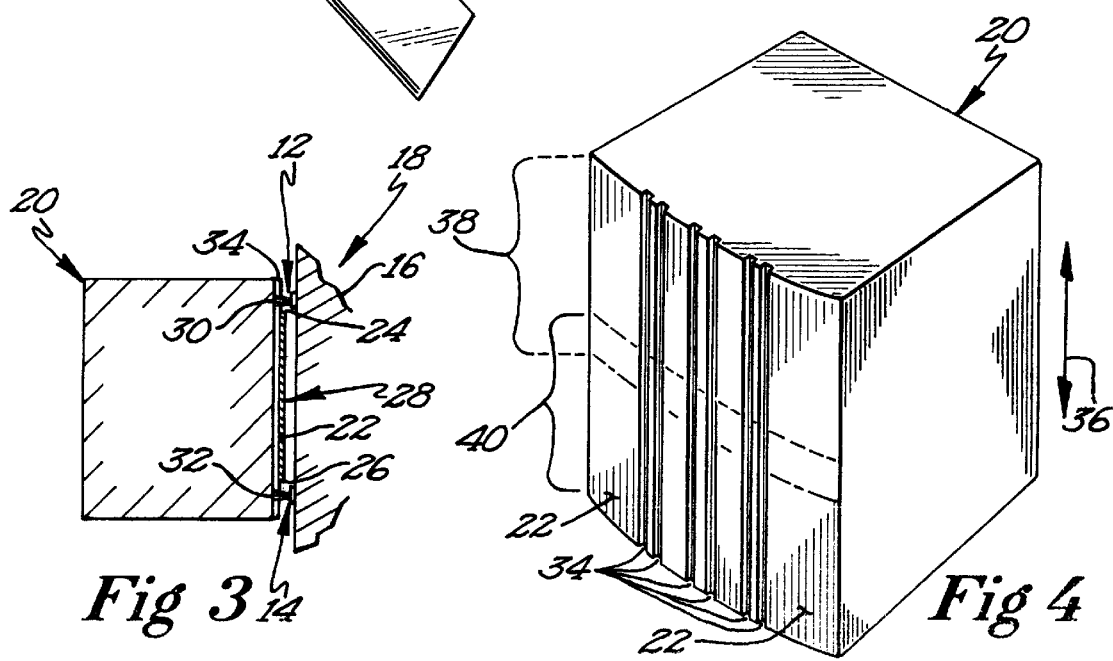
Fig 3
Fig 4

CARTRIDGE HAVING BRUSHES ABOVE AND BELOW A CLEANING TAPE FOR CLEANING THE RECIPROCATING READ/ WRITE HEAD OF A MAGNETIC TAPE PLAYER AND/OR RECORDER

BACKGROUND OF THE INVENTION

The present invention relates generally to an improved cleaning cartridge for cleaning the read/write head of a computer data backup drive, and more specifically to cleaning the air bleed slots in a read/write head.

The subject matter of U.S. Pat. No. 5,541,794 contains a detailed disclosure of a cleaning cartridge of the type discussed herein, and is hereby incorporated by reference herein. Typical tape backup drive systems employ a magnetic media recording tape, the read/write head of the tape drive, and firmware within the tape drive used to initiate proper operation of the drive for backup and for cleaning purposes. Typical magnetic media used in computer data backup tapes have traditionally been constructed of an elongated tape coated with ferric oxide. Recently, backup tapes using a media coating of metal particles have become common. All magnetic media containing coatings have a tendency to generate debris during usage. Magnetic media having metal particle coatings typically shed more debris than ferric oxide magnetic media coatings.

Traditionally, tape drive read/write heads have had contours on the media-contacting portion of the head consisting of smooth bumps with ramps. Recently, many tape drive read/write heads have begun to use heads with media-contacting portions of the head having bumps with sharp edges. These new read/write heads also contain a plurality of substantially vertical slots, known as air bleed slots, which assist in the provision of good read/write head to media tape contact.

Typical magnetic media tape speeds across a read/write head are from 90 to 120 inches per second. When the media tape is moving with such high speed across a read/write head, air may become trapped between the tape and the read/write head, creating an air bearing which adversely affects the quality of contact between the tape and the read/write head. The substantially vertical air bleed slots of a new type read/write head are aligned substantially perpendicular to the direction of motion of the media tape past the read/write head. The sharp edges of the air bleed slots effectively cut the air build up between the read/write head and the tape. The air bleed slots serve to allow this cut air to be dissipated from between the read/write head and the media tape through the slots, allowing a more consistent head to tape contact.

It is well known that a build up of debris within a tape drive can lead to decreased performance and even damage to the tape drive. Some of the debris shed by the magnetic media accumulates in the air bleed slots. When these slots become partially or fully filled with debris, they are no longer effective in allowing cut air to bleed away from the interface between the magnetic tape and the read/write head. When this happens, the quality of contact between the tape head and magnetic media is compromised. Traditional cleaning tapes move across the read/write head of a tape drive in a direction substantially perpendicular to the vertical slots. During a cleaning operation, firmware for the drive causes the read/write head to reciprocate vertically up and down. However, even this vertical reciprocation does not allow effective cleaning of the air bleed slots by the cleaning tape. The reason for this is that the cleaning tape does not penetrate into the slots. Accordingly, a conventional cleaning tape is inefficient to fully clean the read/write head of a tape drive when the read/write head contains air bleed slots.

It would therefore be desirable to provide a cleaning cartridge capable of not only cleaning the read/write head of a tape drive, but also of cleaning the air bleed slots of a read/write head.

It would also be desirable to provide an apparatus to clean the air bleed slots of a read/write head, wherein the apparatus may be used with existing tape drive cleaning cartridges.

SUMMARY OF THE INVENTION

The present invention overcomes the problems of the prior art by providing an improved cleaning cartridge which not only cleans the read/write head of a tape drive, but also loosens and cleans debris from the air bleed slots of the read/write head. The present invention comprises, in combination with a cleaning cartridge of the type disclosed in U.S. Pat. No. 5,541,794, at least two of stationary cleaning elements positioned so as to engage the slots of the read/write head during a cleaning operation and to clean debris from the slots.

The cleaning elements are attached to the cleaning cartridge housing and positioned so that the read/write head of the tape drive contacts the stationary cleaning elements during a cleaning operation.

The stationary cleaning elements are designed so that some portion of each cleaning element extends into a position in which the stationary cleaning elements will come in contact with the substantially vertical air bleed slots in a manner which allows the stationary cleaning elements to loosen and or remove debris from the air bleed slots. To accomplish this, the stationary cleaning elements are designed and positioned so that each stationary cleaning element has associated filaments or strands of material which extend substantially perpendicularly to the tape contact face of the read/write head of the tape drive during a cleaning operation.

The stationary cleaning elements are positioned substantially parallel to the direction of tape movement, and so that each stationary cleaning element provides the cleaning capability for a different section of the read/write head of the computer tape drive. Since the read/write head of the computer tape drive reciprocates vertically during a cleaning operation, the stationary cleaning elements come in contact with the read/write head in such a position to provide effective cleaning of the entire length of the air bleed slots. As the read/write head reciprocates substantially vertically during a cleaning operation, the stationary cleaning elements are swept over a substantially larger section of the head than they would contact if the read/write head did not vertically reciprocate. The reciprocation of the read/write head allows full cleaning coverage of the entire read/write head of a computer tape drive by the stationary cleaning elements.

In order to effect the full coverage of the read/write head of the computer data backup drive by the stationary cleaning elements, it is necessary to properly position the cleaning elements so that the sections of the read/write head for which the stationary cleaning elements clean the substantially vertical air bleed slots overlap slightly. Knowing the displacement vertically of the read/write head during a cleaning operation allows the effective positioning of the cleaning elements so that the first cleaning element provides cleaning coverage for at least half of the read/write head of the computer data backup drive, and the second stationary cleaning element provides cleaning coverage for at least the other half of the read/write head. Additional cleaning elements could be added in order to further increase the cleaning effectiveness of the present invention.

A variety of materials will provide physical characteristics sufficient to effectively loosen and remove debris from within the air bleed slots without damaging the read/write head. Examples of materials suitable for use as a stationary cleaning element include a single row of nylon threads containing multiple filaments, multiple rows of nylon threads containing multiple filaments, foam, natural brush fibers, sponge, polyester, and the like. An important consideration for determining the material to be used for the stationary cleaning elements is that it provides sufficient stiffness and penetration to be able to effectively loosen and clean debris from the substantially vertical air bleed slots of the read/write head of the computer data backup drive. Specific cleaning objectives could be met using varying diameter and number of filaments per thread and other material characteristics of the stationary cleaning elements.

During a cleaning operation, the read/write head of the tape drive comes in contact with and displaces the cleaning tape of the cleaning cartridge such as the cartridge described in the incorporated reference. Effective positioning of the cleaning elements at a point on the cleaning cartridge housing inward from the normal cleaning tape path will allow the stationary cleaning elements to contact the read/write head when the head is in its optimal cleaning position in which the cleaning tape is displaced somewhat from its non-use position. It is sufficient that the filaments or strands of the stationary cleaning elements are positioned to enable them to penetrate the air bleed slots and to loosen and clean any accumulated debris therefrom.

In combination with a standard cleaning cartridge for a computer data backup tape drive, the stationary cleaning elements provide a complete apparatus for fully cleaning the tape contact surface and air bleed slots of a read/write head simultaneously.

These and other benefits of the present invention will become apparent from the following detailed description thereof taken in conjunction with the accompanying drawings, wherein like reference numerals designate like elements throughout the several views.

BRIEF DESCRIPTION OF THE DRAWINGS

FIG. 1 is a perspective view of the stationary cleaning elements of the present invention in combination with a cleaning tape and cleaning cartridge;

FIG. 2 is a top view of the cleaning cartridge of FIG. 1 taken along lines 2—2 thereof, and showing the stationary cleaning elements and cleaning tape during a cleaning operation;

FIG. 3 is a section view taken along lines 3—3 of FIG. 2 showing the cleaning tape and stationary cleaning elements during a cleaning operation; and FIG. 4 is a perspective view of a typical read/write head of a computer data backup drive.

DESCRIPTION OF THE PREFERRED EMBODIMENTS

Referring now to the drawings, and especially to FIG. 1, the present invention 10 is shown in detail. Invention 10 preferably comprises a pair of stationary cleaning elements 12 and 14 attached to the housing 16 of a cleaning cartridge 18. Stationary cleaning elements 12 and 14 are positioned so that when cleaning cartridge 18 is placed in a tape drive for cleaning the read/write head 20 of the tape drive, the stationary cleaning elements 12 and 14 contact the read/write head 20 on its tape contact surface 22. Surface 22 is the surface of the read/write 20 which contacts the magnetic media tape of a typical computer data backup tape. Cleaning elements 12 and 14 may be seen to be positioned near opposite edges 24 and 26 of cleaning tape 28, respectively. The position of stationary cleaning element 12, near edge 24 of cleaning tape 28, may also be described as being above cleaning tape 28. The position of stationary cleaning element 14, near edge 26 of cleaning tape 28, may also be described as being below cleaning tape 28. This is best seen in FIG. 3. The stationary cleaning elements 12 and 14 are positioned so that both the cleaning tape 28 and the stationary cleaning elements 12 and 14 may contact the read/write head 20 at the same time.

Depending upon the size and position of the cleaning tape 28, additional stationary cleaning elements may be utilized to increase the cleaning effectiveness of the invention 10. The positioning of such additional cleaning elements could be above and below cleaning elements 12 and 14.

Stationary cleaning elements 12 and 14 are attached to the housing 16 of cartridge 18 by any suitable attachment method, including gluing, molding, and the like. As shown in FIG. 1, cleaning elements 12 and 14 are preferably positioned substantially parallel to the direction of motion of cleaning or media tape. The filaments or strands 30 preferably extend substantially perpendicular to the face 22 of read/write head 20, although all that is required is that the filaments or strands 30 are positioned so that they can penetrate slots 34 for cleaning. Suitable attachment of the stationary cleaning elements 12 and 14 to the housing 16 of cartridge 18 requires the cleaning elements 12 and 14 to have their bristles or strands 30 and 32, respectively, extending so that the bristles or strands 30 and 32 can penetrate air bleed slots 34, which extend substantially vertically along tape contact surface 22 of read/write head 20. Slots 34 are typically from eight to twelve thousandths of an inch wide, and three to six thousandths of an inch deep. The air bleed slots 34 are substantially perpendicular to the normal travel direction of a cleaning tape such as cleaning tape 28 or a magnetic media tape used in the tape drive.

During a cleaning operation, read/write head 20 displaces cleaning tape 28 to the position shown in FIG. 2, wherein the cleaning tape 28 and that stationary cleaning elements 12 and 14 are each in direct contact with tape contact surface 22 of read/write head 20. In this position, the filaments or strands 30 and 32 of stationary cleaning elements 12 and 14 respectively, extend into slots 34 of read/write head 20. During a cleaning operation, firmware within the tape drive causes read/write head 20 to reciprocate in the direction shown by arrow 36. The up and down motion of read/write head 20 while the filaments or strands 30 and 32 of stationary cleaning elements 12 and 14 extend into the slots 34 of read/write head 20 allows the filaments 30 and 32 of stationary cleaning elements 12 and 14 to loosen and remove accumulated debris from slots 34 along their entire vertical length.

The positioning of stationary cleaning elements 12 and 14 is such that the reciprocation of read/write head 20 allows the stationary cleaning elements 12 and 14 to loosen and remove debris from the entire vertical length of the slots 34. Read/write head 20 and slots 34 have an upper portion 38 comprising at least the top half of the read/write head 20, tape contact surface 22, and slots 34 (FIG. 4). Read/write head 20 and slots 34 also have a lower portion 40 comprising at least the bottom half of the read/write head 20, tape contact surface 22, and slots 34 (FIG. 4). Upper section 38 and lower section 40 preferably overlap to allow full cleaning coverage of slots 34 by stationary cleaning elements 12 and 14. While this overlapping of the upper section 38 and the lower section 40 is preferable, in order to ensure full cleaning of slots 34 by cleaning elements 12 and 14, sections 38 and 40 need not overlap if the reciprocating motion of read/write head 20 allows the sections 38 and 40 to comprise the full length of the slots 34. Further overlapping sections would be created by use of additional stationary cleaning elements.

The stationary cleaning elements 12 and 14 may be comprised of a variety of materials, provided that the material chosen for stationary cleaning elements 12 and 14 is sufficiently stiff to loosen and remove debris from slots 34 yet flexible enough to effectively penetrate slots 34. The preferred stationary cleaning elements 12 and 14 comprise a single row of nylon threads containing multiple filaments. These nylon threads may be part of a deconstructed section of woven nylon, or may be individual nylon threads having multiple filaments. Multiple rows of nylon threads containing multiple filaments could also be used. Other materials which are capable of penetrating slots 34 while still providing sufficient stiffness to loosen and remove debris from slots 34 include foam, natural fibers, sponge, polyester, and the like. Differing read/write heads 20 may have different size slots 34. In the preferred embodiment wherein stationary cleaning elements 12 and 14 comprise a single row of nylon threads forming filaments or strands 30 and 32, the thread diameter and/or number of filaments of each thread may be modified to achieve specific cleaning objectives.

In operation, the present invention 10 functions as follows. When a cleaning cartridge such as cleaning cartridge 18 is inserted into the tape drive of a computer data backup system, firmware within the tape drive recognizes a cleaning operation. The read/write head 20 of the tape drive comes into contact with and displaces the cleaning tape 28 of cleaning cartridge 18. At the same time, the displacement by the read/write head 20 of cleaning cartridge 18 brings the tape contact surface 22 of read/write head 20 into contact with upper and lower stationary cleaning elements 12 and 14, and more specifically with the filaments or strands 30 and 32 of stationary cleaning elements 12 and 14, respectively. The tape drive firmware initiates a reciprocating up and down motion of read/write head 20, as indicated by motion arrow 36, in order to allow the cleaning tape 28 to fully clean the entire tape contact surface 22 of read/write head 20.

At the same time, the positioning of read/write head 20 causes the filaments or strands 30 and 32 of stationary cleaning elements 12 and 14 to penetrate into slots 34 of the read/write head 20. The reciprocating motion of read/write head 20 causes the filaments or strands 30 and 32 of cleaning elements 12 and 14 to loosen and remove debris along the length of slots 34, cleaning accumulated debris from the slots 34 to prevent the formation of an air bearing which would affect tape to read/write head 20 contact. The cleaning of the read/write head tape contact surface 22 and the slots 34 occurs simultaneously. This allows the cleaning tape 28 not only to clean the tape contact surface 22 of read/write head 20, but also to carry away debris loosened or removed from slots 34 of read/write head 20 by filaments or strands 30 or 32 of stationary cleaning elements 12 and 14.

The principles of the present invention 10 are applicable not only to 5¼ inch and 3½ inch computer data backup drives, but also to the cleaning of any read/write head containing slots in the tape contact surface. Further, although the slots 34 described above are indicated to be substantially vertical, future read/write heads may incorporate slots in a different orientation. All that is necessary to modify the present invention to accomplish effective cleaning of slots of different orientations is to properly reorient the stationary cleaning elements 12 and 14.

The detailed description outlined above is considered to be illustrative only of the principles of the invention. Numerous changes and modification will occur to those skilled in the art, and there is no intention to restrict the scope of the invention to the detailed description. The preferred embodiment having been described in detail the scope of the invention should be defined by the following claims.

What is claimed is:

1. A cleaning cartridge for cleaning a reciprocating read/write head of a tape drive, the cleaning cartridge having a housing and a supply of cleaning tape positioned to engage the read/write head during use, the cleaning tape having a pair of opposed edges, a side that contacts the head during use, and an opposite side, the improvement comprising:

a first, stationary cleaning element attached to the housing on the opposite side of the tape from that which contacts the head and disposed so as to contact the read/write head during a cleaning operation, said first stationary cleaning element positioned adjacent one edge of the cleaning tape in immediate proximity to the location where the cleaning tape will engage the read/write head; and a second, stationary cleaning element attached to the housing on the opposite side of the tape from that which contacts the head and disposed so as to contact the read/write head during said cleaning operation, said second stationary cleaning element positioned adjacent the opposite edge of the cleaning tape in substantial alignment with the first cleaning element, and with the cleaning tape and cleaning elements being constructed and arranged so that the cleaning tape will be positioned substantially between the first and second cleaning elements during a cleaning operation;

whereby the read/write head is cleaned by said first and said second cleaning elements and the cleaning tape.

2. The cleaning cartridge described in claim 1, wherein: said first and said second stationary cleaning elements comprise a single row of nylon threads, the nylon threads having multiple filaments.

3. The cleaning cartridge described in claim 2, wherein: said first and said second stationary cleaning elements are positioned so that said row is substantially parallel to the cleaning tape and said threads are substantially perpendicular to the cleaning tape.

4. The cleaning cartridge described in claim 1, wherein: said first and said second stationary cleaning elements comprise a plurality of rows of nylon threads, each said thread having multiple filaments.

5. The cleaning cartridge described in claim 1, wherein: said first and said second stationary cleaning elements comprise a plurality of filaments extending substantially perpendicular to the cleaning tape.

6. A cleaning cartridge as described in claim 1 wherein said cleaning elements are positioned in a vertical plane displaced rearwardly from the vertical plane in which the cleaning tape is normally disposed in a rest, non-cleaning position.

7. A cleaning cartridge as described in claim 6, wherein: said first and said second stationary cleaning elements are mounted in a recess within the housing of the cleaning cartridge rearwardly of the cleaning tape, whereby when the read/write head is in a cleaning position which displaces the cleaning tape, the cleaning tape and said first and said second stationary elements contact the read/write head simultaneously.

8. A cleaning cartridge for cleaning a read/write head of a tape drive of a computer data backup system, the read/write head vertically reciprocating during a cleaning operation and having a plurality of substantially vertical slots with distinct edges, the slots having upper and lower portions, and the cleaning cartridge having a housing and a supply of cleaning tape having a side that contacts the head during use, and an opposite side, the tape positioned to engage the read/write head while moving substantially perpendicular to the head slots during a cleaning operation, the improvement comprising:

a first, stationary cleaning element attached to the housing on the opposite side of the tape from that which contacts the head and disposed so as to contact the read/write head during said cleaning operation, said first stationary cleaning element positioned above the cleaning tape so as to engage the upper portions of the head slots as the read/write head reciprocates vertically; and a second, stationary cleaning element attached to the housing on the opposite side of the tape from that which contacts the head and disposed so as to contact the read/write head during said cleaning operation, said second stationary cleaning element positioned below the cleaning tape so as to engage the lower portions of the head slots as the read/write head reciprocates vertically, said first and second cleaning elements being located rearwardly of the cleaning tape when the tape is in its rest, non-cleaning position;

whereby the slots of the read/write head are cleaned by said first and said second stationary cleaning elements.

9. The cleaning cartridge described in claim 8, wherein:
said first and said second stationary cleaning elements comprise a single row of nylon threads, the nylon threads having multiple filaments.

10. The cleaning cartridge described in claim 9, wherein:
said first and said second stationary cleaning elements are positioned so that said row is substantially parallel to the cleaning tape and said threads are substantially perpendicular to the cleaning tape.

11. The cleaning cartridge described in claim 8, wherein:
said first and said second stationary cleaning elements comprise a plurality of rows of nylon threads, each said thread having multiple filaments.

12. The cleaning cartridge described in claim 8, wherein:
said first and said second stationary cleaning elements are recessed within the housing of the cleaning cartridge, whereby when the read/write head is in a cleaning position which displaces the cleaning tape towards the housing, the cleaning elements contact the read/write head and, the cleaning tape and said first and said second stationary elements contact the read/write head simultaneously.

13. The cleaning cartridge described in claim 8, wherein:
said first and said second stationary cleaning elements comprise a plurality of filaments extending substantially perpendicular to the cleaning tape.

* * * * *